Patented Dec. 25, 1945

2,391,815

UNITED STATES PATENT OFFICE 2,391,815

ETHERS OF PRIMARY NITROALKANES AND METHOD OF PREPARING THEM

Carl T. Bahner, Jefferson City, Tenn.

No Drawing. Application June 15, 1944,
Serial No. 540,536

5 Claims. (Cl. 260—614)

This invention relates to novel ethers of primary nitroalkanes having the following structural formula and to a method for preparing them

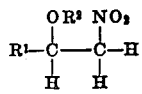

in which $R^1$ and $R^2$ represent alkyl radicals.

An object of the present invention is to provide a new series of nitro ethers of the class described.

A further object of the invention is to provide a novel method for preparing alkyl ethers of primary nitroalkanes.

These and other objects are accomplished by my invention in which I react a 2-alkyl-1-nitroethene with alkaline alcoholates in alcohol solutions.

In practicing my invention, I first prepare a solution of an alcoholate of an alkali metal by any suitable method, for example, by dissolving an alkali metal or alkali metal hydroxide in an alcohol corresponding to the ether desired, for example, I use methyl alcohol to dissolve the alkaline methoxide if a methoxy compound is desired, ethyl alcohol to dissolve the alkaline ethoxide to produce an ethoxy compound, etc.

Better yields of the nitro ethers are obtained when the water content of the reaction mixture is low as the presence of water promotes the formation of nitroalcohols rather than the desired ethers. For this reason, the alkali solution may be made with anhydrous alcohols, especially in cases where the alkali hydroxide rather than the alkali metal is used to form the alcoholate, as commercial solid alkali hydroxides contain appreciable quantities of water. Small quantities of water in the reaction mixture do not seriously affect the yield of ether, and commercial aqueous alcohols such as 95% ethyl alcohol can be used where precautions are taken to limit the total quantity of water introduced with all the components of the reaction mixture.

To the alkaline alcoholate solution, I add the desired 2-alkyl-1-nitroethene slowly with vigorous stirring at temperatures not appreciably exceeding room temperature and preferably considerably below such temperature, for example, between about 0 and 20° C. After the reaction is complete the product is present as the metal salt and may be recovered at this point as such if desired. If the free ether is desired, the solution is acidified with a weak acid, for example, with acetic acid, releasing an oily layer of the desired ether which is recovered by distillation. Satisfactory yields are obtained, varying somewhat according to the particular ether produced, usually between about 15 and 40% of theoretical.

The alcoholate used may be that of any convenient alkali metal, for example, sodium or potassium, and the like. Sodium is preferred because of its cheapness and ready availability.

The mechanism of the reaction is not completely understood, but a possible explanation is, that the metal alcoholate formed ionizes, whereupon the negative alkyloxy group attaches itself at the No. 2 carbon and the positive alkali metal ion associates itself with the negative ion of the "aci" form of the nitro group. On acidification, the nitro ether is created.

These steps may be represented somewhat as follows:

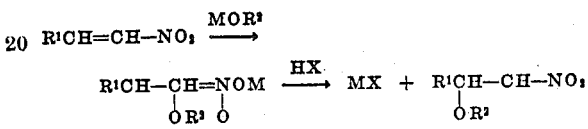

where M is alkali metal and $R^1$ and $R^2$ are alkyl radicals and X represents the positive radical of the particular acid used.

Whatever the mechanism of the reaction, I find that the method functions well to yield the ethers of the type described, of which the following may be mentioned as examples; 1-nitro-2-ethoxypentane; 1-nitro-2-methoxy-octane; 1-nitro-2-ethoxybutane; 1-nitro-2-propoxypropane, and the like.

In many cases, for example, where the ethers are to be used as intermediates in further syntheses, it may be desirable to recover the ether in the form of its alkali or alkaline earth metal salt, as many syntheses employ reactants in this form, and in such cases the acidification of the reaction product of the metal alcoholate and the nitroolefin will be unnecessary, and the salt may readily be recovered after its formation in the manner described.

As illustrative of the method of preparing the ethers of my invention, the following examples are given:

EXAMPLE I

*Preparation of 1-nitro-2-ethoxypentane*

A solution of sodium ethoxide was made by dissolving 5.7 parts of metallic sodium in 95 parts of absolute ethanol. This solution was cooled to about 15° C. and then 23 parts of 1-nitro-1-pentene was added in small portions with vigorous stirring. The temperature rose promptly after each portion was added but was kept below 20° C. by use of an ice bath. The lachrymatory odor of the nitroolefin disappeared within a few minutes after all the 1-nitro-1-pentene had been added, indicating that the sodium aci 1-nitro-2-ethoxypentane had formed. The mixture was allowed to stand for an hour after formation of the salt, then was cooled to about 5° C. and acidified with 15 parts of glacial acetic acid. The resulting curdy mass was diluted with water, and an oily liquid separated which was found to have a volume of 22 parts after washing with water. It was dried over calcium chloride and found to have the following characteristics:

$n_D^{25}=1.428$; $d_4^{25}=0.99115$.
Calculated for 1-nitro-2-ethoxypentane.
$MR_D^{25}=41.80$. Found 41.80.

EXAMPLE II

*Preparation of 1-nitro-2-methoxyoctane*

A 42 g. portion of 1-nitro-1-octene was added drop-wise to a solution of sodium methoxide prepared by adding 8.4 g. sodium to 95 ml. of absolute methanol. The reaction mixture was kept cool for about an hour longer, then acidified by addition of 30 ml. of acetic acid. After standing over night the mixture was diluted to about 600 ml. The crude product which separated was washed several times with water, then dried over calcium chloride. The weight of crude product was 50 g. The washed and dried product was distilled through a six bulb Snyder column, using a reflux ratio of 5:1. A 6 g. fraction came over up to 90° C. at 3 mm., then a 20.2 g. fraction came over from 90–92° C. $d_4^{25}=0.9655$. $n_D^{25}=1.436$. Molecular refraction calculated for 1-nitro-2-methoxyoctane=51.04. Found =51.24.

EXAMPLE III

*Preparation of 1-nitro-2-ethoxybutane*

A 45 g. portion of 1-nitro-1-butene was added drop-wise to a solution of sodium ethoxide prepared by adding 11.5 g. of sodium to 200 ml. of absolute ethanol. The temperature was kept between 15° C. and 20° C. during the addition of the nitroolefin, by use of an ice bath. The mixture was allowed to stand one hour, then acidified by addition of 30 ml. of acetic acid. Two days later the solution was diluted to 1000 ml. by addition of water. The crude product, volume 45 ml., was washed repeatedly and dried over calcium chloride. A 35 ml. portion of this material was distilled through a six bulb Snyder column, using a reflux ratio of 5:1. The weight of distillate obtained at 50–52° C. and 2 mm. was 19½ g. corresponding to a yield of approximately 30%. For the product: $d_4^{25}=0.992$. $n_D^{25}=1.421$. Molecular refraction calculated for 1-nitro-2-ethoxybutane =37.36. Found=37.22.

| Analysis | Calculated | Found |
|---|---|---|
| Carbon | 48.96 | 48.62 |
| Hydrogen | 8.91 | 8.98 |

My invention provides a simple and useful method for preparing nitro ethers of the class described which are useful as intermediates in various organic syntheses.

While the above description points out the preferred embodiments of my invention it will be understood that departures can be made therefrom within the scope of the specification and claims.

What is claimed is:

1. In a process for preparing ethers of primary nitroalkanes having the following structural formula

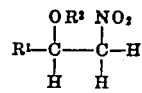

in which $R^1$ and $R^2$ represent alkyl radicals, the steps which comprise reacting a 2-alkyl-1-nitroethene of the following structure

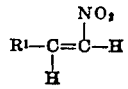

in which $R^1$ represents an alkyl radical with an alkali metal alcoholate and thereafter acidifying and recovering the product.

2. A process for preparing alkyl ethers of primary nitroalkanes having the nitro group and the ether group on adjacent carbon atoms, which comprises reacting a 2-alkyl-1-nitroethene in which the nitro group is attached to a doubly bound carbon atom with an alkali metal alcoholate in solution in the corresponding alcohol, and thereafter acidifying and recovering the product.

3. In a process for preparing 1-nitro-2-ethoxypentane the step which comprises reacting 1-nitro-1-pentene with an ethoxide of an alkali metal in ethyl alcohol solution and thereafter acidifying and recovering the product.

4. In a process for preparing 1-nitro-2-methoxy-octane, the step which comprises reacting 1-nitro-1-octene with a methoxide of an alkali metal in methyl alcohol solution and thereafter acidifying and recovering the product.

5. In a process for preparing 1-nitro-2-ethoxybutane, the step which comprises reacting 1-nitro-1-butene with an ethoxide of an alkali metal in ethyl alcohol solution and thereafter acidifying and recovering the product.

CARL T. BAHNER.